United States Patent [19]

Bringuier et al.

[11] Patent Number: 5,684,904
[45] Date of Patent: Nov. 4, 1997

[54] OPTICAL CABLE INCORPORATING LOOSE BUFFER TUBES COATED WITH A MOISTURE-ABSORPTIVE MATERIAL

[75] Inventors: Anne G. Bringuier, Taylorsville; Larry W. Field, Hickory; Clinton E. Clyburn, III, Taylorsville, all of N.C.

[73] Assignee: Siecor Corporation, Hickory, N.C.

[21] Appl. No.: 661,244

[22] Filed: Jun. 10, 1996

[51] Int. Cl.⁶ ........................................ G02B 6/44
[52] U.S. Cl. .................. 385/109; 385/106; 385/112; 385/114
[58] Field of Search .......................... 385/100–114

[56] References Cited

U.S. PATENT DOCUMENTS

| | | |
|---|---|---|
| 4,535,098 | 8/1985 | Evani et al. ................ 521/149 |
| 4,767,184 | 8/1988 | Ogasawara et al. . |
| 5,157,752 | 10/1992 | Greveling et al. ............ 385/112 |
| 5,179,611 | 1/1993 | Umeda et al. ............ 385/109 X |
| 5,388,175 | 2/1995 | Clarke .................. 385/109 X |
| 5,440,660 | 8/1995 | Dombrowski et al. ........... 385/102 |

FOREIGN PATENT DOCUMENTS 3-137607  6/1991  Japan .

*Primary Examiner*—Phan T.H. Palmer

[57] ABSTRACT

An optical fiber cable includes optical fibers loosely housed within a buffer tube. The buffer tube includes an inner coating, an outer coating, or both inner and outer coatings of moisture-absorptive material. The moisture-absorptive material may be a mixture of a moisture-absorptive powder and a thermoplastic resin; or a thermally crosslinked polymer; or a mixture of a moisture-absorptive resin and a resin cured by ultraviolet light.

22 Claims, 5 Drawing Sheets

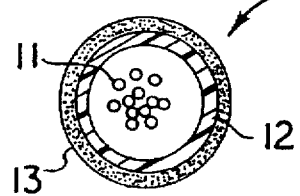
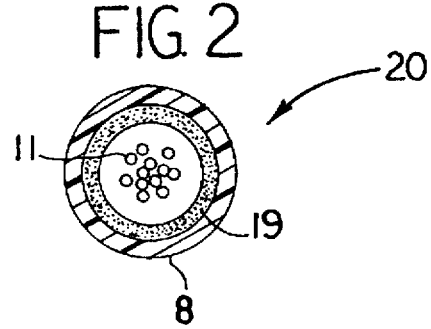
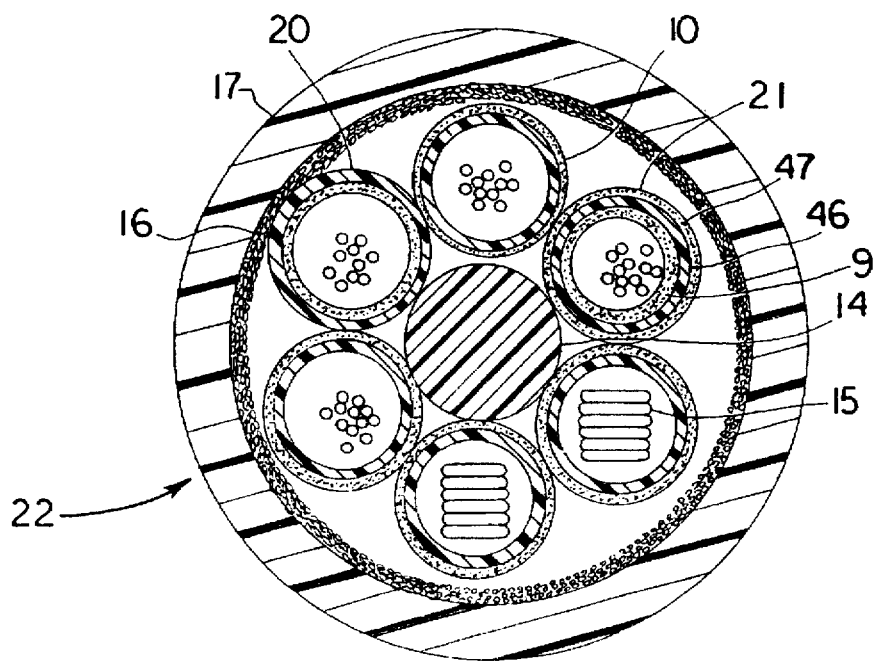

OPTICAL CABLE INCORPORATING LOOSE BUFFER TUBES COATED WITH A MOISTURE-ABSORPTIVE MATERIAL

BACKGROUND OF THE INVENTION

This invention relates to optical fiber telecommunication cables.

Optical fiber cables employ various techniques to prevent or restrict migration of moisture along cable internal passages. In one such technique, cable passages may be filled by a pressurized gas. Upon an escape of gas through a ruptured cable jacket, an alarm provides notice of cable damage. However, the gas does not prevent the flow of water into and along the cable internal passages before the repair is effected.

In another technique for preventing or restricting migration of moisture along cable passages, a hydrophobic grease or gel may be inserted into cable passages to physically block the spread of moisture. A disadvantage of such greases or gels is that they must be compatible for a long period of time with plastic materials forming the tubes surrounding them. As a result, the tubes may need to be formed of more expensive polymers than those which would otherwise be required. Another disadvantage of greases and gels is that they may make the cables more difficult and less pleasant to handle during their manufacture, installation, and repair.

Another technique for restricting migration of moisture along cable passages is the insertion of well-known polymer materials which swell upon contact with water in order to absorb the water which is present and to physically close the passage to restrict further flow of moisture. Various cable designs have been proposed which employ such materials. The polymers in powder form may be inserted directly into the cable. These powders may also be carried by yarns or tapes. The powders may also be embedded into the surface of cable plastic materials, or adhered to interior cable surfaces by adhesive.

In U.S. Pat. No. 5,157,752, a plurality of optical fibers are loosely held in a tube and a tape is attached to the inner surface of the tube. The tape is a carrier for particulate water swellable material such as polyacrylate particles. Thus, the optical fibers within the tube lie radially inward from the tape.

In Japanese Patent Application No. 3-137607, a water-absorptive resin which is cured by ultraviolet light is employed as the outermost tightly adhering layer of a coated optical fiber. A water-absorptive resin which is cured by ultraviolet light also is employed as the outermost tightly adhering layer of a matrix common coating of an optical fiber ribbon.

U.S. Pat. No. 4,767,184 discloses an optical fiber ribbon having an outermost common coating comprising water-swelling material. A cross-linked denatured polyvinyl alcohol may be the sole constituent of the outermost common coating. In the alternative, the outermost common coating may be formed of a resin such as polyvinyl alcohol, ethylene and vinyl acetate, a polyurethane, polyamide, or polyester along with a high-water-absorptive polymer such as a crosslinked polyacrylate, a graft copolymer of starch and acrylic acid, a graft copolymer of starch and acrylonitrile, a copolymer of vinyl acetate and an acrylate, a copolymer of isobutylene and maleic anhydride, a copolymer of polyvinyl alcohol and maleic anhydride, or a cross-linked carboxymethylcellulose.

SUMMARY OF THE INVENTION

An object of the present invention is to provide optical fiber cables incorporating loose buffer tubes which are protected against the flow of moisture within cable internal passages in improved ways. A buffer tube as used herein does not include a tube in the sheath system of a cable.

Another object of the present invention is to provide optical fiber cables which are water-blocked with less or no reliance on swellable powders, yarns, tapes, and water-blocking gels.

Another object of the present invention is to provide optical fiber cables which are satisfactorily water-blocked within or alongside of buffer tubes loosely containing one or more optical fibers or optical fiber ribbons.

These and other objects of the invention are met by providing a loose tube type optical fiber cable employing water-absorptive materials which form a layer on a buffer tube inner surface, outer surface, or inner and outer surfaces. Therefore, separate swellable powder-carrying tapes, yarns, or gels are not inserted within or alongside of the buffer tubes.

In a first embodiment of the invention, a buffer tube layer comprises a mixture of a thermoplastic resin and at least 15% by weight of the mixture of a moisture-absorptive powder. In this first embodiment, the water-absorptive layer may be applied as the inner or outer layer, or as both the inner and outer layers of the buffer tubes.

In a second embodiment of the invention, a buffer tube outer layer comprises a thermally crosslinked moisture-absorptive polymer. Advantageously, the swelling speed of such materials is rapid, thus minimizing the risk of moisture traversing a substantial distance through cable internal passages.

In a third embodiment, the buffer tube inner or outer layer comprises moisture-absorptive material which is cured by radiation. Material which is cured by radiation in the ultra-violet range may be employed. If the moisture-absorptive layer is the buffer tube inner layer, the other buffer tube layer or layers must be sufficiently transparent to ultraviolet rays to allow the moisture-absorptive layer to be cured.

In a first version of the third embodiment, the moisture-absorptive material comprises a mixture of a moisture-absorptive resin and a resin cured by ultraviolet radiation. In a second version of the third embodiment, the moisture-absorptive material comprises an interpenetrating polymer network generated from an aqueous or aqueous/alcohol solution of polyacrylic acid sodium salt and an ultraviolet radiation-polymerizable soluble acrylate monomer. In a third version of the third embodiment, the moisture-absorptive material comprises a mixture of acrylic acid, sodium acrylate, acrylate oligomer, and a photoinitiator.

BRIEF DESCRIPTION OF THE DRAWINGS

The preferred embodiments of the invention are described in the several drawings, in which:

FIG. 1 is a cross-sectional view of a plurality of optical fibers contained in a buffer tube having an outer water-absorptive layer;

FIG. 2 is a cross-sectional view of a plurality of optical fibers contained in a buffer tube having an inner water-absorptive layer;

FIG. 3 is a cross-sectional view of a cable incorporating buffer tubes shown in FIGS. 1 or 2;

DETAILED DESCRIPTION OF THE INVENTION

Figure 4:
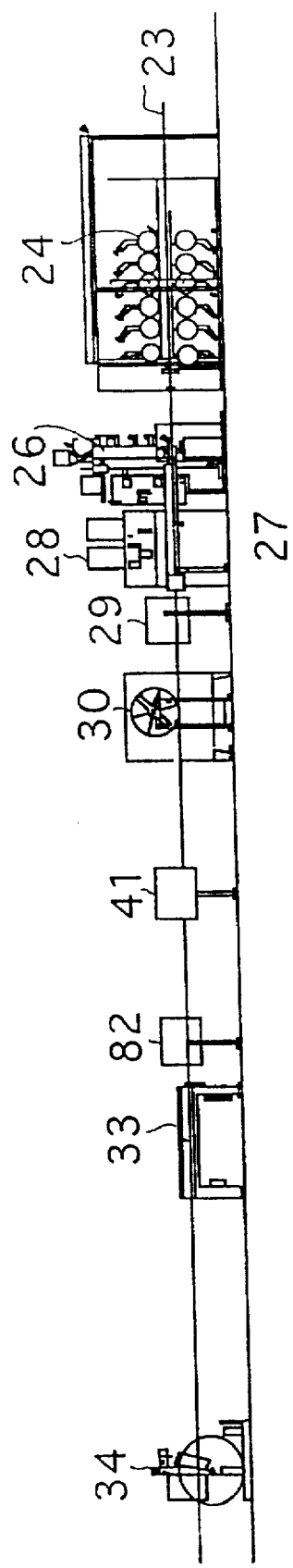
FIG. 4 is a schematic view of a buffering line used to manufacture buffer tubes shown in FIG. 1 or 2 wherein the water-absorptive layer is a hot-melt resin.

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

The term "optical fiber" herein means an optical waveguide, typically including a core, a cladding, and a single layer or multiple layer coating placed on the external lateral surface of the cladding. None of the buffer tubes as described herein comprise an adhesive. The moisture-absorptive layers do not comprise adhesives and are not applied with the use of adhesives.

In FIG. 1, cable subunit 10 comprises a plurality of optical fibers 11 loosely disposed within a buffer tube having an inner layer 12 formed of polymer material and an outer layer 13 formed of moisture-absorptive material. The term "loosely disposed" as used herein means that the optical fibers or optical fiber ribbons are movably disposed within the tube such that they may adjust their position within the buffer tube in response to external stresses caused by changes in temperature or bending of the cable during manufacture or handling, thereby lowering the stresses on the optical fibers or optical fiber ribbons.

In FIG. 2, cable subunit 20 comprises a plurality of optical fibers 11 loosely disposed within a buffer tube having an outer layer 8 formed of polymer material and an inner layer 19 formed of moisture-absorptive material. Optical fiber ribbons also may be inserted within a buffer tube having an outer layer formed of polymer material and an inner layer formed of moisture-absorptive material.

In the cable 22 shown in FIG. 3, a central member 14 is surrounded by a layer of cable subunits. Central member 14 may be formed of a dielectric material such as glass reinforced plastic, or may instead be formed of a metallic material such as steel. The central member may include a polymer coating if desired. The cable subunits may include a subunit 10 as shown in FIG. 1; a subunit 20 as shown in FIG. 2; and subunits including a plurality of optical fiber ribbons 15 loosely disposed within a buffer tube having one layer formed of polymer material and another layer formed of moisture-absorptive material.

Subunit 21 comprises a plurality of optical fibers loosely disposed within a buffer tube having a layer of polymer material 46 between an inner layer 9 formed of moisture-absorptive material and an outer layer 47 formed of moisture absorptive material.

Inner layer 16 of tube 17 may also comprise a moisture-absorptive material as described herein.

Several methods may be used to manufacture cables according to the invention.

With reference to FIG. 4, the moisture-absorptive layer or layers may be formed from a thermoplastic resin mixed with a superabsorbent powder. The reels 24 paying off the optical fibers 11 or optical fiber ribbons 15 are arranged on both sides of the passline 23. The axes of rotatable reels 24 may be stationary, or they may be fixed to a rotating cage if the optical fibers or optical fiber ribbons are to be stranded. A suitable degree of tension is placed on the optical fibers 11 or optical fiber ribbons 15 through the action of a braking means on each reel 24 as is well known to the art. The optical fibers or optical fiber ribbons then pass through a coextruder crosshead 26, which extrudes around the optical fibers 11 or optical fiber ribbons 15 a tube formed of at least one layer of polymer material, which may be a single layer formed, for example, of polypropylene, or a dual layer formed of materials such as polybutylene terepthalate and polycarbonate. A dual layer tube may be formed in a single crosshead with two melt channels, as is well known to the art. The optical fibers or ribbons are loosely disposed within the tube.

In addition, an inner layer of the buffer tube may be extruded from a mixture of a thermoplastic resin and at least 15% by weight of the mixture of a moisture-absorptive powder. The thermoplastic resin may, for example, be an elastomer such as ethylene vinyl acetate or other materials such as low density polyethylene or very low density polyethylene. The size of the superabsorbent powders used may range from one micron to five hundred microns in diameter. Examples of superabsorbent powders which may be used are polymers derived from sodium or potassium salts of acrylic acid. Commercially available suitable superabsorbent powders include Cabloc 80 HS from Stockhausen, Inc. and Aridall 1470 and 1460F from Chemdal Corporation.

In the presence of moisture, the tube swellable layer or layers expand to absorb the moisture and also fill adjacent cable interstices to block the further flow of moisture within the cable.

If the tube inner layer is swellable, the tube contains sufficient space within the inner layer to allow swelling to take place without damage to the optical fibers or ribbons therein.

The buffer tubes then pass through a first cooling trough 27, a drying chamber 29, and around a coupling sheave 30. At sheave 30, the optical fibers or ribbons are coupled to the tube. Subsequent tube shrinkage may impart a suitable excess length to the optical elements with respect to the length of the buffer tube.

If an outer layer of moisture-absorptive material is to be applied, the extruded tube then may pass through a wipe die 41 which applies the mixture of a thermoplastic resin and at least 15% by weight of the mixture of a moisture-absorptive powder.

Figure 6:
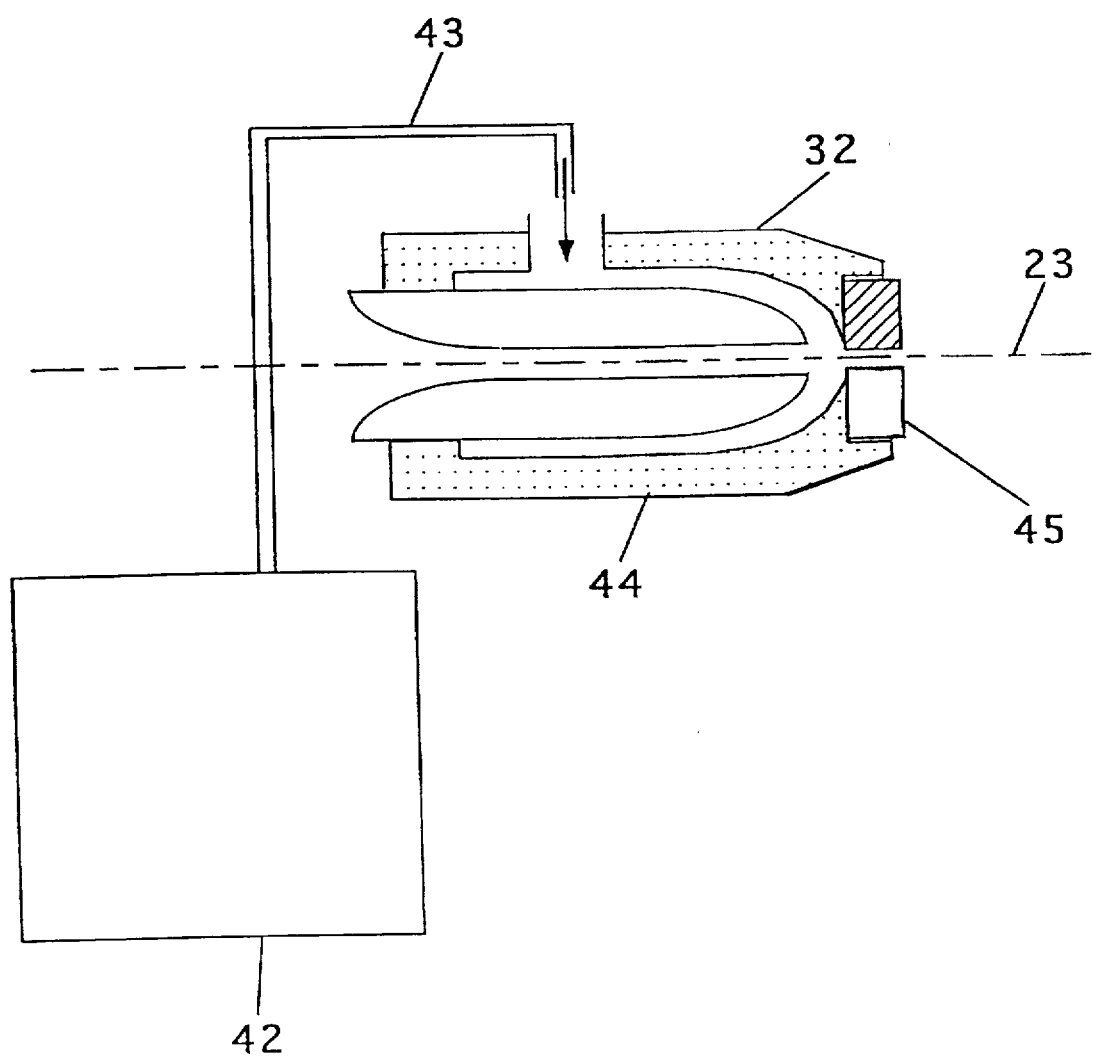
FIG. 6 is a sectional view of a chamber pumping system shown in FIG. 5.

As an alternative, the moisture-absorptive material may be applied about the layer of polymer material with the use of a chamber pumping system such as shown in FIG. 6 and discussed below.

The buffer tubes then may pass through an optional second cooling station 82. The completed buffer tube is then pulled by any suitable pulling device 33 and is wound onto a take-up reel 34. Control panels 28 aid the operator in controlling the operation.

Figure 5:
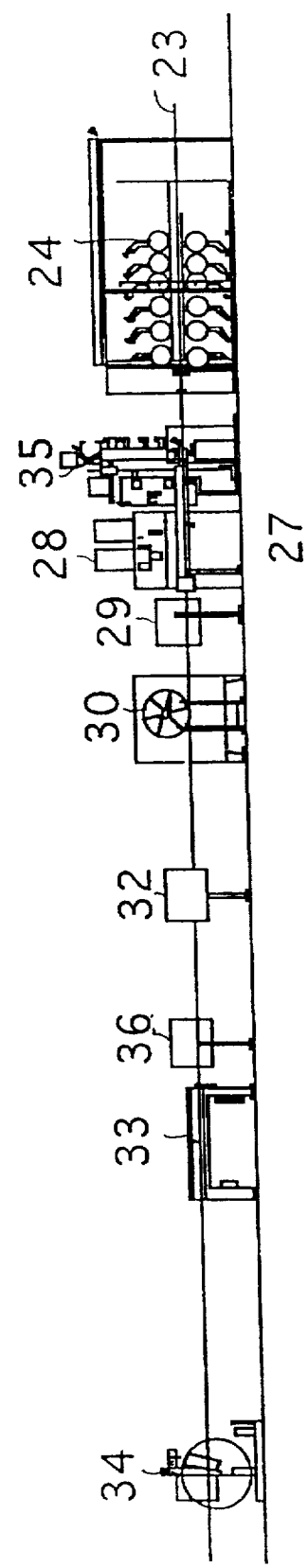
FIG. 5 is a schematic view of a buffering line used to manufacture buffer tubes shown in FIG. 1 or 2 wherein the water-absorptive layer is formed from a solution which is crosslinked by heat.

In a second embodiment of the invention as shown in FIG. 5, a buffer tube outer layer 13 is a thermally crosslinked moisture-absorptive polymer. The rapid swelling speed of such materials quickly closes adjacent cable interstices to block the further flow of moisture. Commercially available material suitable to be used for this purpose is DP6-6066 sold by Allied Colloids Inc. and materials made by Camelot Superabsorbents Ltd. of Calgary. If material stiffness leads to cracking of the moisture-absorptive layers, the materials may be modified to become more flexible through the use of elastomeric material.

In FIG. 5, extruder 35 places only the layer or layers 12 of polymer material about the optical elements 11 or 15. After leaving coupling sheave 30, the partially formed buffer tube passes through a chamber 32 which applies the outer layer 12 of thermally crosslinkable material in aqueous solution.

Chamber 32 may be a simple vat, or it may be a pump applicator system as shown in FIG. 6. The thermally crosslinkable polymer material is stored in a vessel 42 and pumped through duct 43 to a heated applicator 44. As the tube travels along passline 23, the thermally crosslinkable material coats the tube. A wiping die 45 removes any excess material.

Heat is applied in chamber 36 to crosslink the material, and to evaporate the water portion of the aqueous solution. Other numbered elements of the buffering line shown in FIG. 5 retain the same functions as described for FIG. 4.

Figure 7:
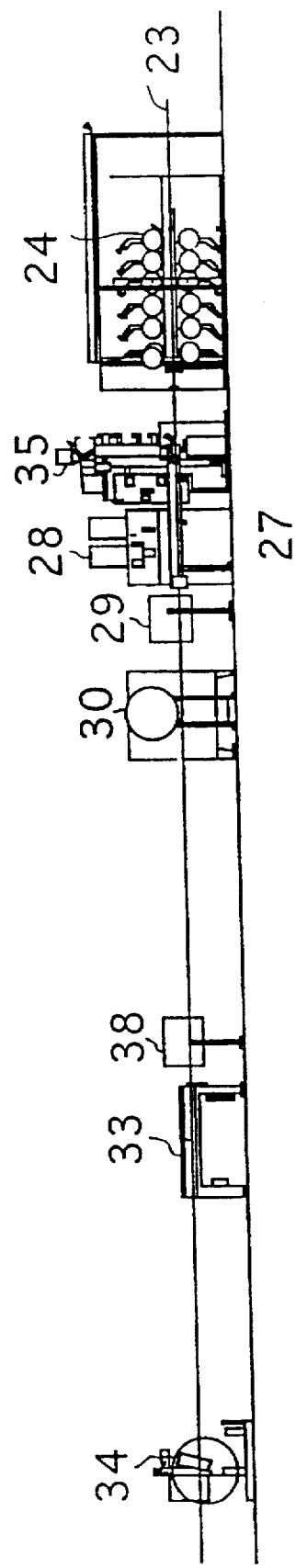
FIG. 7 is a schematic view of a buffering line used to manufacture buffer tubes shown in FIG. 1 or 2 wherein the water-absorptive layer is formed from a material which is cured by ultraviolet radiation.

In the process depicted in FIG. 7, the buffer tube inner or outer layer comprises moisture-absorptive material which is cured by radiation. Material curable by radiation in the ultraviolet range is preferred. As in FIG. 5, only the polymer layer or layers are applied by extruder 35. After the partially completed buffer tubes leave coupling sheave 30, they pass through station 38 where ultraviolet light curable material is applied and cured by lamps. Other numbered elements of the buffering line shown in FIG. 5 retain the same functions as described for FIG. 7.

If an ultraviolet curable material is applied to serve as a buffer tube inner layer 19, a polymer material 8 (see FIG. 2) may be formed of a material, such as certain grades of polycarbonate and polypropylene, sufficiently transparent to ultraviolet radiation to allow curing of the inner layer 19. In the alternative, a cationic ultraviolet curing system may be used, in which curing is initiated by a lamp shining through the extruder tip. Curing then continues during the next twenty-four hours.

Three variations of the ultraviolet curable material may be employed. In the first variation, the moisture-absorptive layer may be formed of a mixture of ultraviolet curable material and super-absorbent powder, the super-absorbent powder comprising more than fifteen percent of the mixture. The particle size of the super-absorbent powder may be one to three hundred micrometers in diameter. The ultraviolet curable material may comprise five to thirty-five percent hydrophilic acrylates of various functionalities (f) such as one or more of 2-ethoxyethyl methacrylate (f=1), ethylene glycol diacrylate (f=2), or ethoxylated trimetholpropane triacrylate (f=3); one to ten percent acrylic acid; fifteen to fifty percent acrylate oligomer; and one-half to two percent photoinitiator.

In a second variation, the ultraviolet-curable material may be an interpenetrating polymer network generated from an aqueous or aqueous/alcohol solution of polyacrylic acid sodium salt and a soluble acrylate monomer capable of being polymerized with ultraviolet light. One example is a mixture of ten to fifty percent monomer, ten to forty percent acrylate oligomer, and up to two percent photoinitiator. This material is a solid which may be dissolved in water. After application to the tube, the water is driven off by heat.

In a third variation, the ultraviolet-curable material is a mixture of ten to thirty percent acrylic acid, fifty to eighty percent sodium acrylate, ten to forty percent oligomer, and up to two percent photoinitiator. In the third variation, unlike the first variation, the superabsorbent material is covalently bonded to the ultraviolet curable polymer network.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A cable, comprising:
at least one optical fiber movably disposed within a buffer tube having inner and outer layers, at least one of said inner or outer layers comprising a mixture of a thermoplastic resin and at least 15% by weight of the mixture of a moisture-absorptive material, said tube not comprising an adhesive.

2. A cable as set out in claim 1, wherein a said layer comprising moisture-absorptive material is the innermost layer of said tube.

3. A cable as set out in claim 1, wherein said moisture-absorptive material is a thermally crosslinked polymer.

4. A cable as set out in claim 1, wherein a said layer comprising moisture-absorptive material is the outermost layer of said tube.

5. A cable comprising at least one optical fiber movably disposed within a buffer tube having inner and outer layers, at least one of said inner or outer layers comprising a moisture-absorptive material cured by radiation.

6. A cable as set out in claim 5, wherein said moisture-absorptive material is obtained from the reaction of a mixture of acrylic acid, sodium acrylate and an acrylate oligomer.

7. A cable as set out in claim 6, wherein said mixture comprises ten to thirty percent by weight of said acrylic acid, fifty to eighty percent by weight of said sodium acrylate, and ten to forty percent by weight of said acrylate oligomer.

8. A cable as set out in claim 5, wherein said moisture-absorptive material comprises a mixture of a moisture-absorptive resin and a resin cured by ultraviolet radiation.

9. A cable as set out in claim 8, wherein said resin cured by ultraviolet radiation is a hydrophilic polyacrylate material.

10. A cable as set out in claim 9, wherein said hydrophilic polyacrylate material is obtained from the reaction of monomers selected from the group consisting of 2-ethoxyethyl methacrylate, ethylene glycol diacrylate, and ethoxylated trimetholpropane triacrylate.

11. A cable as set out in claim 5, wherein said moisture-absorptive material comprises an interpenetrating polymer network formed from a polyacrylic acid sodium salt solution and a soluble acrylate monomer cured by ultraviolet radiation.

12. A cable, comprising:
at least one optical fiber ribbon movably disposed within a buffer tube having inner and outer layers, at least one of said inner or outer layers comprising a mixture of a thermoplastic resin and at least 15% by weight of the mixture of a moisture-absorptive material, said tube not comprising an adhesive.

13. A cable as set out in claim 12, wherein a said layer comprising moisture-absorptive material is the innermost layer of said tube.

14. A cable as set out in claim 12, wherein a said layer comprising moisture-absorptive material is the outermost layer of said tube.

15. A cable as set out in claim 12, wherein said moisture-absorptive material is a thermally crosslinked polymer.

16. A cable comprising at least one optical fiber ribbon movably disposed within a buffer tube having inner and outer layers, at least one of said inner or outer layers comprising a moisture-absorptive material cured by radiation.

17. A cable as set out in claim 15, wherein said moisture-absorptive material comprises a mixture of a moisture-absorptive resin and a resin cured by ultraviolet radiation.

18. A cable as set out in claim 16, wherein said resin cured by ultraviiolet radiation is a hydrophilic polyacrylate material.

19. A cable as set out in claim 17, wherein said hydrophilic polyacrylate material is obtained from the reaction of monomers selected from the group consisting of 2-ethoxyethyl methacrylate, ethylene glycol diacrylate, and ethoxylated trimetholpropane triacrylate.

20. A cable as set out in claim 16, wherein said moisture-absorptive material is obtained from the reaction of a mixture of acrylic acid, sodium acrylate, and an acrylate oligomer.

21. A cable as set out in claim 20, wherein said mixture comprises ten to thirty percent by weight of said acrylic acid, fifty to eighty percent by weight of said sodium acrylate, and ten to forty percent by weight of said acrylate oligomer.

22. A cable as set out in claim 16, wherein said moisture-absorptive material comprises an interpenetrating polymer network formed from a polyacrylic acid sodium salt solution and a soluble acrylate monomer cured by ultraviolet radiation.

* * * * *